United States Patent [19]
Godyak et al.

[11] Patent Number: 5,300,860
[45] Date of Patent: Apr. 5, 1994

[54] CAPACITIVELY COUPLED RF FLUORESCENT LAMP WITH RF MAGNETIC ENHANCEMENT

[75] Inventors: Valery A. Godyak, Brookline; Robert B. Piejak, Wayland; Benjamin M. Alexsandrovich, Brookline, all of Mass.

[73] Assignee: GTE Products Corporation, Danvers, Mass.

[21] Appl. No.: 961,753

[22] Filed: Oct. 16, 1992

[51] Int. Cl.⁵ .................................... H05B 41/24
[52] U.S. Cl. ............................. 315/39; 315/248
[58] Field of Search ........... 315/246, 248, 335, 344, 315/174, 175, 176, 39; 313/485, 638, 492, 162

[56] References Cited

U.S. PATENT DOCUMENTS

| | | | |
|---|---|---|---|
| 2,139,815 | 12/1938 | Fodor | 315/246 |
| 2,569,154 | 9/1951 | Donath | 315/344 |
| 3,497,767 | 2/1970 | Guillon et al. | 315/344 |
| 4,005,330 | 1/1977 | Glascock, Jr. et al. | 315/57 |
| 4,010,400 | 3/1977 | Hollister | 315/248 |
| 4,017,764 | 4/1977 | Anderson | 315/248 |
| 4,189,661 | 2/1980 | Haugsjaa et al. | 315/39 |
| 4,266,167 | 5/1981 | Proud et al. | 315/248 |
| 4,427,923 | 1/1984 | Proud et al. | 315/248 |
| 4,798,997 | 1/1989 | Egami et al. | 315/115 |
| 4,857,806 | 8/1989 | Nilssen | 315/72 |
| 5,027,041 | 6/1991 | Godyak et al. | 315/248 |
| 5,072,157 | 12/1991 | Greb et al. | 315/248 |
| 5,075,603 | 12/1991 | Yoshiike | 315/335 |
| 5,146,140 | 9/1992 | Piejak et al. | 315/248 |

Primary Examiner—Robert J. Pascal
Assistant Examiner—Michael B. Shingleton
Attorney, Agent, or Firm—Carlo S. Bessone

[57] ABSTRACT

A fluorescent light source includes a fluorescent lamp having first and second electrodes at or near the ends thereof for capacitive coupling of RF electrical energy to a low pressure discharge within the fluorescent lamp and an RF source having a first output lead electrically coupled to the first electrode and a second output lead electrically coupled to the second electrode. The electrodes include circuitry for inducing an RF magnetic field within the fluorescent lamp in the region of the electrodes. The RF magnetic field improves the performance of the capacitively coupled RF light source by creating an auxiliary inductive RF discharge near the capacitive coupling electrodes. The inductive discharge locally increases the plasma density and the electrode sheath capacitance and provides a reduction in RF voltage across the capacitively coupled fluorescent lamp.

9 Claims, 7 Drawing Sheets

CAPACITIVELY COUPLED RF FLUORESCENT LAMP WITH RF MAGNETIC ENHANCEMENT

FIELD OF THE INVENTION

This invention relates to fluorescent light sources and, more particularly, to compact fluorescent light sources wherein a fluorescent lamp is energized by capacitively coupling RF electrical energy to a low pressure discharge within the fluorescent lamp. Improved operation is obtained by providing an RF magnetic field in the region of the capacitive coupling electrodes.

BACKGROUND OF THE INVENTION

Compact fluorescent lamps have been developed as replacements for incandescent lamps because fluorescent lamps are considerably more efficient and have longer operating lives than incandescent lamps. A compact fluorescent lamp has roughly the shape of an incandescent lamp and can be installed in a conventional lamp socket. Prior art compact fluorescent lamps have had one or more disadvantages. A lamp ballast circuit is required, since fluorescent lamps cannot be operated directly from line voltage. The ballast circuit adds to the cost of the lamp and must be packaged in the base of the lamp. Furthermore, the form factor of the fluorescent lamp tube is less than ideal for use as an incandescent lamp replacement because the light emitted per unit volume is maximized in a long, small diameter fluorescent lamp tube.

Current compact fluorescent lamps use a twin tube or double twin tube architecture. Twin tube fluorescent lamps typically include a pair of straight tubes that are interconnected at or near one end to form a generally U-shaped tube. Conventional twin tube fluorescent lamps have filament cathodes at opposite ends, and a continuous discharge extends between the cathode filaments. A compact fluorescent lamp using a frequency converting ballast to convert 60 Hz line voltage to a frequency in the range of 20–30 kHz is disclosed in U.S. Pat. No. 4,857,806 issued Aug. 15, 1989 to Nilssen. The high frequency output of the ballast is applied to the lamp filaments.

Compact fluorescent lamps utilizing electrodeless fluorescent lamps have been disclosed in the prior art. A closed loop magnetic core transformer, contained in a reentrant cavity in the lamp envelope, induces a discharge in an electrodeless fluorescent lamp in U.S. Pat. No. 4,005,330 issued Jan. 25, 1977 to Glascock et al. Discharge is induced by a magnetic core coil within the envelope of an electrodeless fluorescent lamp in the light source disclosed in U.S. Pat. No. 4,017,764 issued Apr. 12, 1977 to Anderson. In both of the above-mentioned patents, the operating frequency is limited to about 50 kHz because of the lossy nature of magnetic materials at high frequency. An electrodeless fluorescent light source utilizing an air core coil for inductive coupling at a frequency of about 4 MHz is disclosed in U.S. Pat. No. 4,010,400 issued Mar. 1, 1977 to Hollister. However, such a light source has a tendency to radiate at the power of operation and exhibits nonuniform plasma excitation.

An electrodeless fluorescent light source, utilizing frequencies in the 100 MHz to 300 GHz range, is disclosed by Haugsjaa et al in U.S. Pat. No. 4,189,661 issued Feb. 19, 1980. High frequency power, typically at 915 MHz, is coupled to an ultraviolet producing low pressure discharge in a phosphor coated electrodeless lamp which acts as a termination within a termination fixture.

A compact fluorescent light source wherein high frequency power is capacitively coupled to a low pressure discharge is disclosed in U.S. Pat. No. 4,266,167 issued May 5, 1981 to Proud et al. The lamp envelope has an outer shape similar to that of an incandescent lamp. An outer conductor, typically a conductive mesh, is disposed on the outer surface of the lamp envelope, and an inner conductor is disposed in a reentrant cavity in the lamp envelope. Frequencies in the range of 10 MHz to 10 GHz are suggested. An electrodeless discharge tube wherein high frequency energy is coupled to a discharge through external electrodes is disclosed in U.S. Pat. No. 4,798,997 issued Jan. 17, 1989 to Egami et al. Another electrodeless fluorescent light source which is energized by a high frequency power source is disclosed in U.S. Pat. No. 4,427,923 issued Jan. 24, 1984 to Proud et al. In all of the lamps that operate at high frequency, it is important to minimize radiation of the high frequency energy.

It is a general object of the present invention to provide improved fluorescent light sources.

It is another object of the present invention to provide a compact fluorescent lamp that is suitable for replacement of an incandescent lamp.

It is a further object of the present invention to provide a fluorescent light source wherein a fluorescent lamp is capacitively driven by RF electrical energy.

It is yet another object of the present invention to provide an RF driven compact fluorescent lamp which produces very little RF radiation.

It is another object of the present invention to provide a highly efficient fluorescent light source wherein a fluorescent lamp is capacitively driven by RF electrical energy.

It is still another object of the present invention to provide fluorescent light sources which are low in cost and easy to manufacture.

SUMMARY OF THE INVENTION

According to the present invention, these and other objects and advantages are achieved in a fluorescent light source comprising a fluorescent lamp having first and second electrodes disposed at or near the ends thereof for capacitive coupling of RF electrical energy to a low pressure discharge within the fluorescent lamp, and an RF source having a first output lead electrically coupled to the first electrode and a second output lead electrically coupled to the second electrode. The electrodes include means for inducing an RF magnetic field within the fluorescent lamp near the electrodes. The RF magnetic field locally increases the plasma density and the sheath capacitance and reduces the RF voltage across the fluorescent lamp and the sheath losses. As a result, the RF magnetic field increases the efficiency and the life expectancy of the fluorescent light source.

The first and second electrodes can comprise conductive coils wound on the outside surface of the fluorescent lamp at or near the ends thereof for inducing an axial magnetic field within the fluorescent lamp. In a preferred embodiment, the conductive coils comprise flat ribbon conductors on the outside surface of the fluorescent lamp for increased capacitive coupling. In another embodiment, the first and second electrodes each comprise a conductive layer on the outside surface of the fluorescent lamp and a conductive coil disposed around the conductive layer for inducing an axial magnetic field within the fluorescent lamp. Each conductive layer is preferably provided with an axial gap to prevent circumferential current flow. In a preferred embodiment, the conductive coils for magnetic enhancement are part of a resonant tank circuit of the RF source.

The fluorescent lamp can comprise a twin tube fluorescent lamp having two straight tube sections and an interconnection between the straight tube sections. When a twin tube fluorescent lamp is used, the magnetic field within the fluorescent lamp can be increased by providing a ferromagnetic element between the straight tube sections at one or both ends of the conductive coils. Alternatively, the fluorescent lamp can comprise a straight, tubular fluorescent lamp.

When necessary, the light source includes starting means for initiating a low pressure discharge within the fluorescent lamp. The RF source preferably operates on a frequency range of about 3 MHz to 300 MHz and most preferably operates in a frequency range of about 10 MHz to 100 MHz.

In accordance with another feature of the invention, the fluorescent light source includes a lamp base for supporting the twin tube fluorescent lamp. The RF source is mounted within the lamp base such that the light source can be installed in a conventional lamp socket.

BRIEF DESCRIPTION OF THE DRAWINGS

For a better understanding of the present invention, together with other and further objects, advantages and capabilities thereof, reference is made to the accompanying drawings, which are incorporated herein by reference and in which.

DETAILED DESCRIPTION OF THE INVENTION

Figure 1:
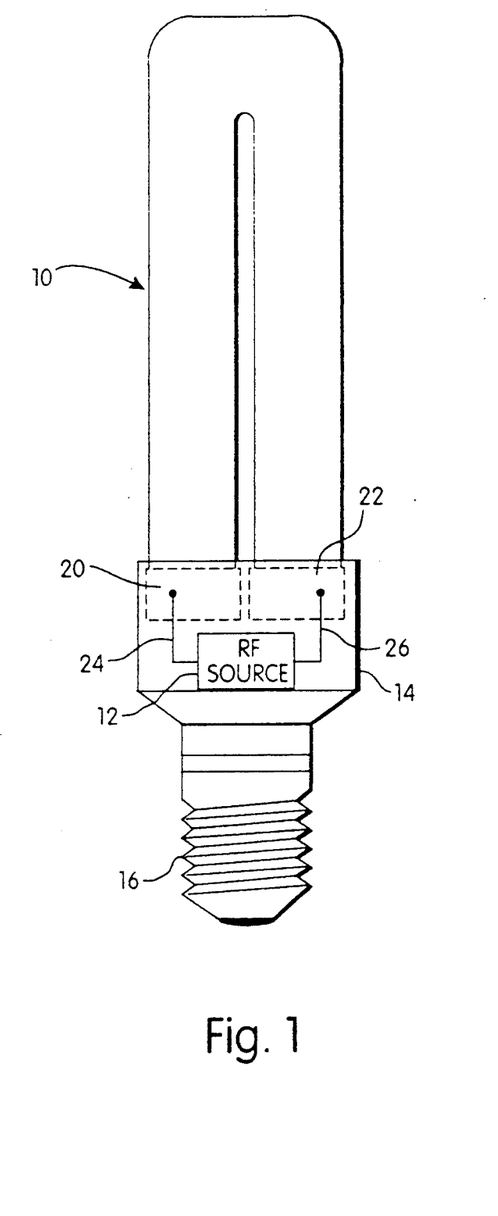
FIG. 1 is an elevational view of a twin tube fluorescent light source that is capacitively driven by RF electrical energy.

A fluorescent light source that is capacitively driven by RF electrical energy is illustrated in FIG. 1. A twin tube fluorescent lamp 10 is driven by an RF source 12. The RF source 12 is preferably mounted in a base 14 of the light source. The base 14 supports twin tube fluorescent lamp 10 and includes a plug 16 for installation in a conventional lamp socket. The RF source 12 is powered by conventional line voltage received through plug 16.

In twin tube fluorescent lamp 10, a glass lamp envelope contains a fill material, such as argon and mercury, for sustaining a low pressure discharge and has a phosphor coating on its inside surface. The term "twin tube fluorescent lamp" is intended to include any fluorescent lamp having two generally straight tube sections that are interconnected at or near one end. Examples include U-shaped lamp tubes as shown in FIG. 1 and parallel tube sections that are joined together by a "kiss joint".

The fluorescent lamp tube 10 has capacitive coupling electrodes 20 and 22 at or near the ends thereof for capacitive coupling of RF electrical energy from source 12 to a low pressure discharge within lamp 10. An output lead 24 of RF source 12 is connected to electrode 20, and an output lead 26 is connected to electrode 22. In the embodiment of FIG. 1, the electrodes 20 and 22 are formed on an external surface of the lamp envelope. The low pressure discharge within fluorescent lamp 10 emits radiation, typically in the ultraviolet, which stimulates emission of visible light by the phosphor coating. Suitable phosphor coatings are well known in the art.

The RF source 12 preferably has an output frequency in the range of about 3 MHz to 300 MHz. Most preferably, the operating frequency is in the range of about 10 MHz to 100 MHz. The use of RF frequencies rather than microwave frequencies (1 GHz or more) permits the fluorescent lamp 10 to be driven with a relatively inexpensive, efficient and easily-built power source. The capacitive coupling technique is advantageous over prior art inductive coupling techniques because of its simple implementation and its relatively high efficiency at low discharge power. Unlike inductive coupling, the capacitive coupling technique makes it possible to effectively energize a twin tube or double twin tube fluorescent lamp.

In the lamp of FIG. 1, RF electrical energy is applied to the external electrodes 20 and 22. Displacement current is coupled through the glass envelope underlying each electrode, preferably with sufficient RF voltage to initiate a low pressure discharge. Plasma sheaths form on the inside of the glass wall opposite the external electrodes. Displacement current couples through the sheath that forms between the charge neutral plasma body and the wall, and conduction current is driven through the plasma column. The resulting gas discharge column is virtually identical to the discharge in a conventional fluorescent light source. However, the plasma sheath adjacent to the electrodes are quite different from a conventional fluorescent lamp in that the sheaths form a capacitor that acts as a ballast for the discharge and limits the discharge current. In addition, ion currents in the RF discharge are substantially lower than found in a low frequency fluorescent discharge lamp, thus resulting in less ion flux to the electrode area.

Figure 2:
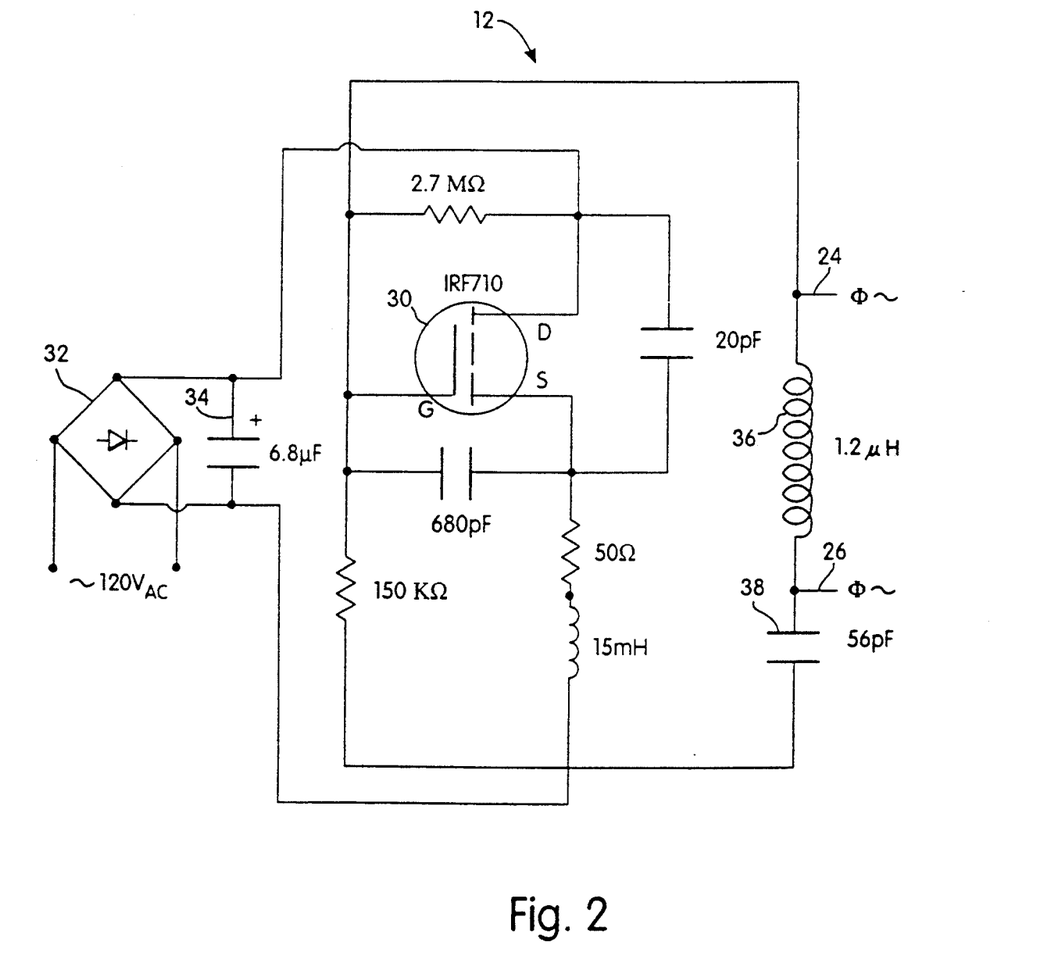
FIG. 2 is a schematic diagram of one example of an RF source that is suitable for the fluorescent light source.

A schematic diagram of a suitable RF source 12 is shown in FIG. 2. A single field effect transistor 30 functions as an amplifier and an oscillator at a frequency of 27.12 MHz. A bridge rectifier 32 and a capacitor 34 convert AC line voltage at 60 Hz to a DC voltage. The transistor 30 operates into a resonant tank circuit, including an inductor 36 and a capacitor 38, which provides sufficient starting and operating voltage on output leads 24 and 26 to initiate a discharge within fluorescent lamp 10 instantly. The output voltage is typically about 350 volts. The disclosed circuit is low cost and simple to build and uses a general purpose, commercially-available transistor. The circuit produces about 8-12 watts of RF power with an efficiency between 60% and 70%. Since the transistor 30 operates with a grounded drain, the drain can be attached to an available heat sink. The lamp is driven symmetrically, thus reducing ion flux to the electrode area and reducing RF radiation.

Figure 3:
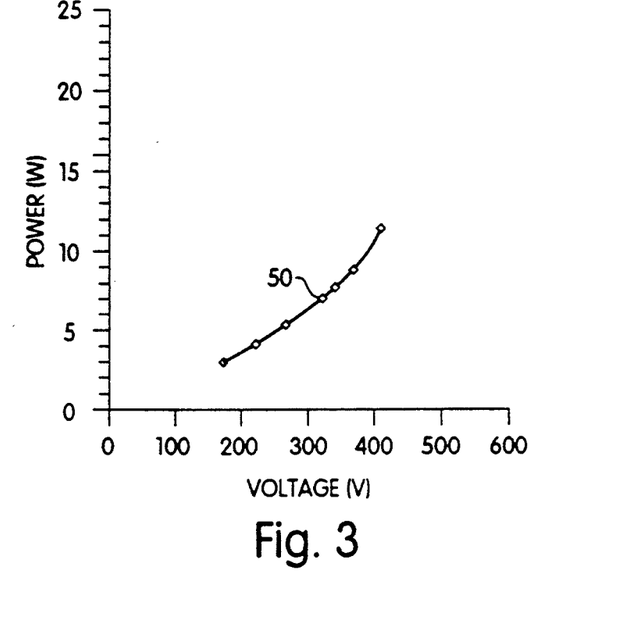
FIG. 3 is a graph of fluorescent lamp discharge power as a function of RF voltage.
Figure 4:
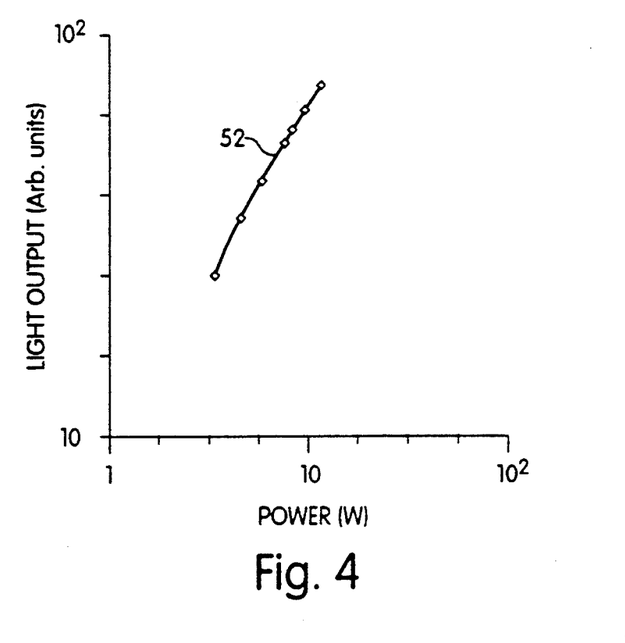
FIG. 4 is a graph of relative light output as a function of discharge power.

Typical curves of the operating characteristics of the fluorescent light source of the present invention are shown in FIGS. 3 and 4. Discharge power as a function of discharge voltage, with the fluorescent lamp driven at 27 MHz, is represented by curve 50 in FIG. 3. Relative light output as a function of discharge power is represented by curve 52 in FIG. 4. The operating characteristics in FIGS. 3 and 4 indicate that the fluorescent light source of the invention is dimmable by reducing the RF voltage applied to the twin tube fluorescent lamp. The lamp can be operated from 3-10 watts with approximately the same efficacy (lumens per watt) at all power levels. The RF source circuit of FIG. 2 can be modified to provide a variable RF voltage for dimming. As shown in FIG. 3, the fluorescent lamp operates at about 350-400 volts, which corresponds to 8-10 watts in the discharge. The overall output during normal operation is estimated to be 50-60 lumens per watt. A preferred operating frequency is 27.12 MHz because the FCC allows radiation of significant power at this frequency.

The twin tube fluorescent lamp used in the fluorescent light source of the present invention produces less RF radiation than a straight fluorescent lamp because the twin tube fluorescent lamp as shown in FIG. 1 is folded back on itself, thus limiting RF radiation. Another advantage of the twin tube fluorescent lamp configuration is that the coupling ends are close together, thereby making it convenient to attach the RF source without long leads and possible radiation losses from coupling leads.

Figure 5:
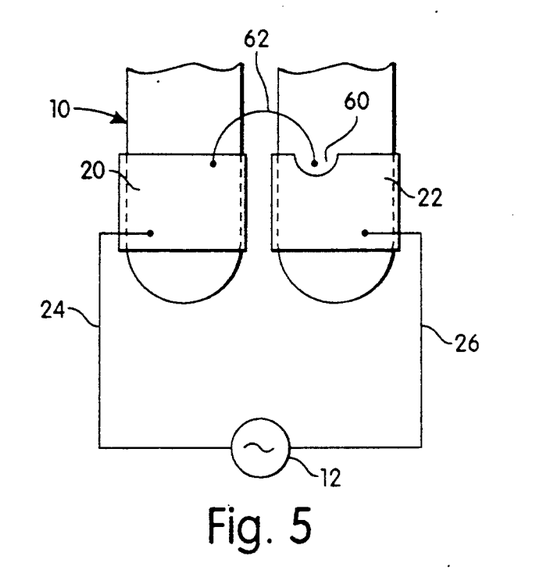
FIG. 5 is a partial schematic view of the twin tube fluorescent lamp in the light source of FIG. 1, showing external capacitive coupling electrodes and a starting device.

An enlarged view of one end of fluorescent lamp 10 is shown in FIG. 5. Electrodes 20 and 22 can be metal layers, or bands, on the outside surface of twin tube fluorescent lamp 10 at or near the ends thereof. Because of the twin tube configuration, the electrodes 20 and 22 are adjacent to each other and are relatively close together. Preferably, electrodes 20 and 22 have a relatively large surface area to enhance capacitive coupling to the plasma of the low pressure discharge within fluorescent lamp 10. In this embodiment, no internal electrodes or filaments are required within fluorescent lamp 10. At a frequency of 27.12 MHz, external metal layers, or bands, $\frac{3}{4}$ inch long are suitable for capacitive coupling of RF electrical energy to the discharge.

As noted above, the RF source 12 typically provides an RF voltage of sufficient magnitude to initiate a low pressure discharge within fluorescent lamp 10. Although the RF voltage required to initiate discharge depends on lamp construction, a typical RF starting voltage is about 350 volts. In cases where the RF voltage is not sufficient to reliably initiate discharge, an additional starting device is preferably utilized. An example of a simple starting circuit is shown in FIG. 5. A notch 60 is formed in electrode 22, and a thin wire 62 is attached to the lamp envelope in notch 60. The other end of the wire 62 is connected to electrode 20. When the RF voltage of source 12 is applied to electrodes 20 and 22, a high field region is created within the lamp 10 adjacent to notch 60, causing a discharge to be initiated. Since the area of contact between wire 62 and fluorescent lamp 10 in notch 60 is very small, the current flow is very small and normal operation is not significantly affected. When a discharge is initiated at one point in the fluorescent lamp 10, the discharge then extends through the length of the lamp between electrodes 20 and 22.

Figure 6:
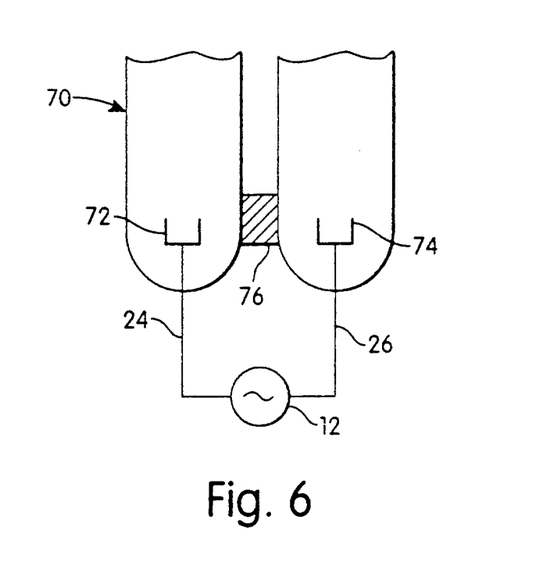
FIG. 6 is a partial schematic view of an alternate embodiment of the fluorescent light source, showing a twin tube fluorescent lamp having cold cathode electrodes and a high permittivity dielectric material to enhance starting.

An alternative embodiment of the twin tube fluorescent lamp suitable for use in a fluorescent light source of the present invention is shown in FIG. 6. A twin tube fluorescent lamp 70 has internally mounted cold cathode electrodes 72 and 74 at or near opposite ends. The cold cathode electrodes 72 and 74 can be nickel o nickel impregnated with Hg (to dispense Hg). To enhance starting, a high permittivity dielectric fill material 76 is located between the arms of the twin tube fluorescent lamp 70. The high permittivity material increases the electric field inside the tube in the volume between the electrodes 72 and 74 sufficiently to initiate breakdown. The high permittivity material can, for example, be glass ($E\gamma \sim 5$).

The performance of capacitively coupled RF driven fluorescent light sources can be improved by creating an auxiliary inductive RF discharge near the capacitive coupling electrodes. The RF magnetic field locally increases the plasma density and the sheath capacitance and reduces the RF voltage across the fluorescent lamp and the sheath losses. As a result, the RF magnetic field increases the efficiency and the life expectancy of the fluorescent light source.

Capacitively coupled RF driven fluorescent light sources are efficient at discharge currents where sheath losses are small. The sheath is the thin region adjacent to each capacitive coupling electrode where a plasma does not exist. Since sheath losses are proportional to the product of the ion current at the electrode and the average voltage across the sheath, more efficient operation typically occurs at lower currents. However, lower currents may not produce a sufficient light output from the fluorescent lamp. Because the discharge current is limited by the impedance of the electrode sheaths, higher discharge currents are obtained by increasing the RF voltage across the sheath. With increasing RF sheath voltage, the average voltage between the plasma and the electrodes increases due to rectification effects, and the sheath losses increase roughly as the square of the discharge current. For high currents, the discharge may no longer be an efficient light source because ion losses may account for a large percentage of the total discharge power dissipation. The ion losses do not contribute to the generation of light.

Although the RF magnetic enhancement technique described below reduces sheath losses at all discharge currents, its main value is at higher discharge currents where sheath losses are important. In general, the technique involves the application of an RF magnetic field in the region of the fluorescent lamp near the capacitive coupling electrodes. The effect of the RF magnetic field is to increase the electron density near the capacitive coupling electrodes. The increased electron density results in a decrease in capacitive reactance in the sheath and ultimately leads to a lower voltage across the sheath than occurs without RF magnetic enhancement (at a given discharge current).

Figure 7:
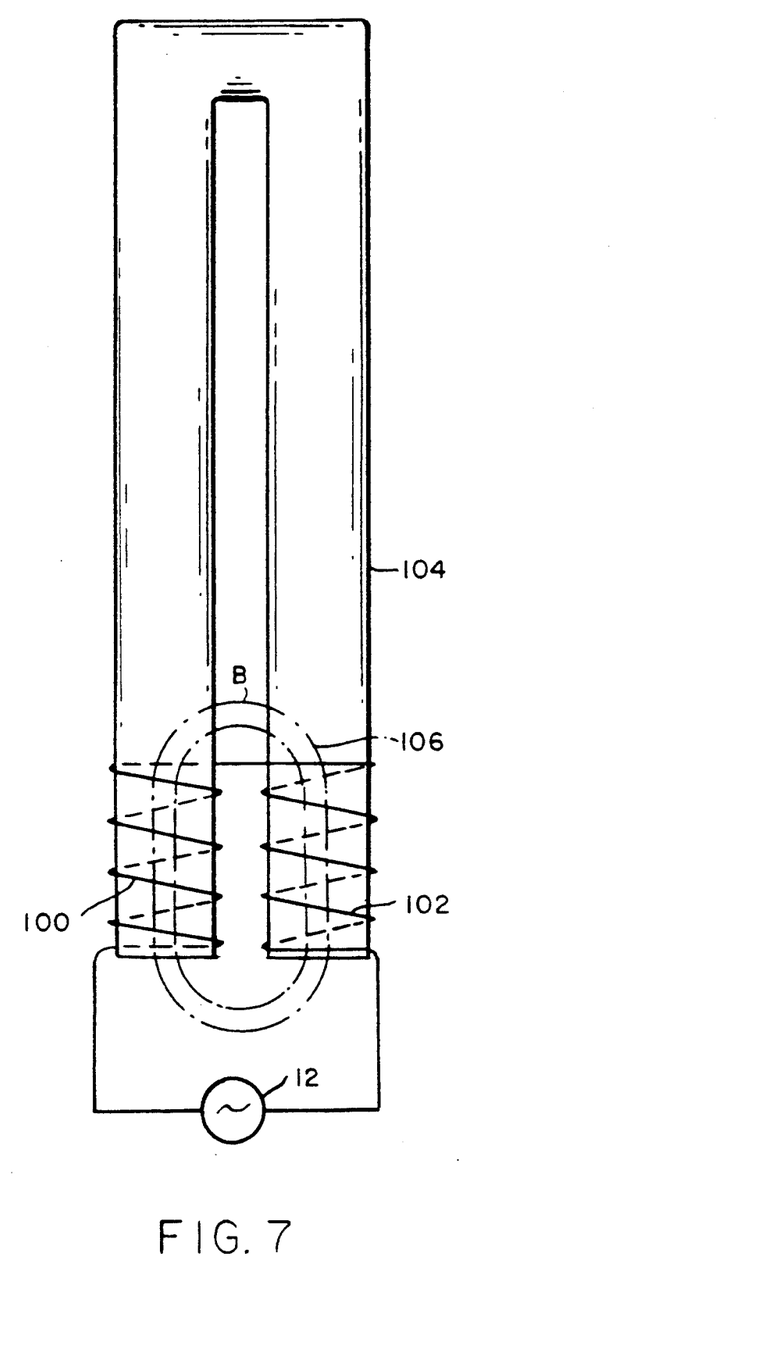
FIG. 7 is a schematic diagram of a twin tube fluorescent lamp which utilizes RF magnetic enhancement of capacitive coupling.

A schematic diagram of a twin tube fluorescent lamp with RF magnetic enhancement is shown in FIG. 7. Conductive coils 100 and 102 are wound around a twin tube fluorescent lamp 104 near the ends thereof. Each of coils 100 and 102 includes a few turns. The coils 100 and 102 are preferably wound as a single, continuous conductor. In a preferred embodiment, the coils 100 and 102 are the inductive element 36 (see FIG. 2) of the resonant tank circuit in the RF source 12. This configuration saves space for the RF source circuit, which is preferably mounted in the base of the fluorescent light source as shown in FIG. 1 and described above. The coils 100 and 102 are wound so as to reinforce each other's magnetic field and to produce a generally axial magnetic field within fluorescent lamp 104 near the ends thereof, as indicated by magnetic field lines 106. The RF potential on the coils 100 and 102 is capacitively coupled through the glass ends of the twin tube fluorescent lamp 104 and creates a capacitive RF discharge that fills the twin tube fluorescent lamp 104. To increase the capacitive coupling, the coils 100 and 102 may be formed as a flat conductive ribbon wound on the ends of fluorescent lamp 104. In the embodiment of FIG. 7, coils 100 and 102 perform the functions of capacitive coupling of RF electrical energy to the discharge within fluorescent lamp 104 and producing an RF magnetic field in the capacitive coupling regions.

As the current flows through coils 100 and 102, time varying magnetic flux is created in a direction along the axis of each coil within the volume enclosed by the coil. The time varying magnetic flux induces a time varying electric field that drives an electric current in a plane perpendicular to the axis of each coil 100 and 102 and within the volume enclosed by the coils. The induced current is opposite in direction to the current in the coils 100 and 102. The induced current enhances the electron density in the plasma volume enclosed by the coils 100 and 102 and results in a reduction in the capacitive reactance between the plasma and the electrodes and ultimately results in a reduction of sheath power loss.

Figure 8:
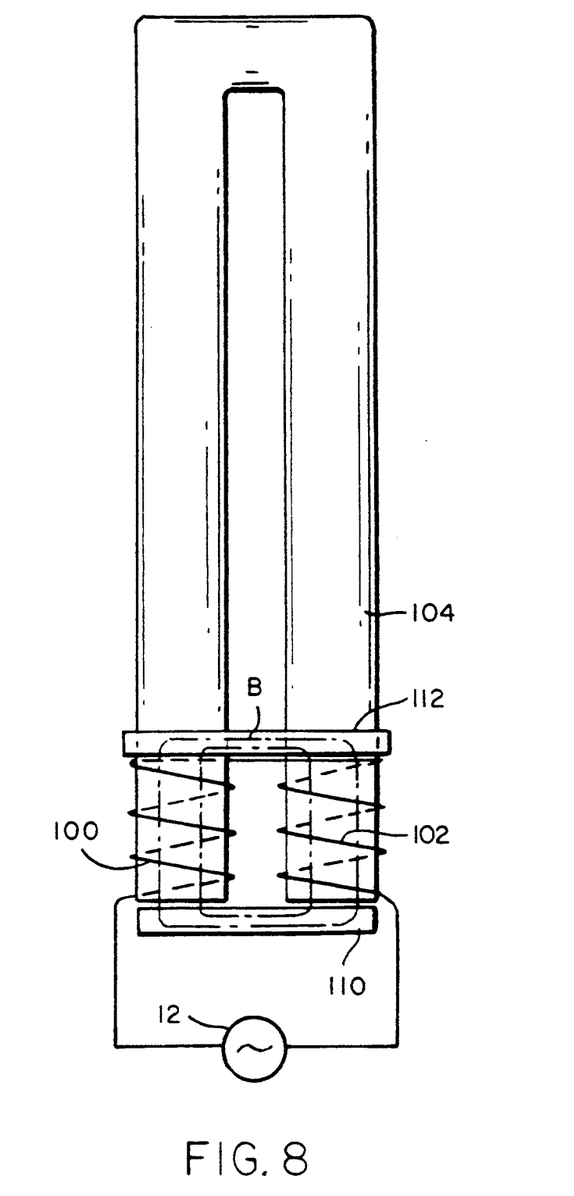
FIG. 8 is a schematic diagram of a twin tube fluorescent lamp which utilizes RF magnetic enhancement of capacitive coupling and includes ferromagnetic material to increase the magnetic field within the fluorescent lamp.

A variation of the RF magnetic enhancement technique is shown in FIG. 8. Like elements in FIGS. D-90-3-884 -17- PATENT APPLICATION 7 and 8 have the same reference numerals. The reluctance of the magnetic path at the ends of coils 100 and 102 is decreased by ferromagnetic elements 110 and 112. The ferromagnetic element 110 extends between the ends of the straight tube sections of fluorescent lamp 104, and ferromagnetic element 112 provides a magnetic path between ends of coils 100 and 102 at an intermediate region of the lamp 104. The decreased reluctance increases the magnetic flux within fluorescent lamp 104 for a given coil current. The increased magnetic flux increases the induced electric field, thus enhancing the effect for a given coil current. It will be understood that either or both of the ferromagnetic elements 110 and 112 can be utilized.

Figure 9:
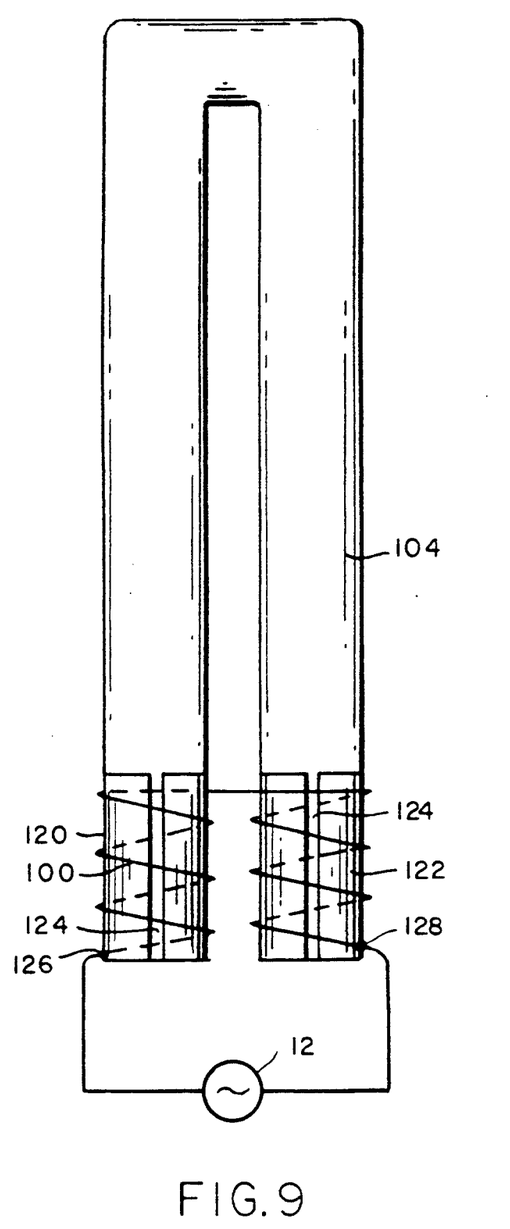
FIG. 9 is a schematic diagram of a twin tube fluorescent lamp which utilizes RF magnetic enhancement of capacitive coupling and includes conductive layers to increase electrode area.

A fluorescent lamp incorporating RF magnetic enhancement with an enlarged electrode area for increased RF capacitive coupling is shown in FIG. 9. Conductive layers 120 and 122 are disposed on the outer surface of fluorescent lamp 104 at or near the ends thereof. Each of the conductive layers 120 and 122 is provided with an axial gap 124 to prevent circumferential current flow which would reduce the magnetically induced electric field in the plasma. The coils 100 and 102 surround conductive layers 120 and 122, respectively. Each coil is connected to the conductive layer at the high voltage end of the coil (at points 126 and 128). The coil should not touch the conductive layer, except at one point so as to avoid shorting of the coil turns. As indicated above, the capacitive coupling electrode area can also be increased by utilizing a flat ribbon coil. From FIGS. 7-9 and the above description, it will be apparent the capacitive coupling electrode and the RF magnetic enhancement means can be separate elements as shown in FIG. 9 or can be integrated into one element as shown in FIG. 7.

The RF magnetic enhancement technique has been shown and described in connection with a twin tube fluorescent lamp. However, the RF magnetic enhancement technique can also be applied to straight fluorescent lamps and to double twin tube fluorescent lamps.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A fluorescent light source comprising:
    a fluorescent lamp having first and second electrodes disposed at or near the ends thereof for capacitive coupling of RF electrical energy to a low pressure discharge within said fluorescent lamp, each of said first and second electrodes comprising a conductive layer on the outside surface of said fluorescent lamp for capacitive coupling of RF electrical energy to a discharge within said fluorescent lamp and a conductive coil disposed around said conductive layer for inducing an axial RF magnetic field within said fluorescent lamp near said electrodes; and
    an RF source having a first output lead electrically coupled to said first electrode and a second output lead electrically coupled to said second electrode.

2. A fluorescent light source as defined in claim 1 wherein said fluorescent lamp comprises two straight tube sections and an interconnection between said straight tube sections at or near one end, said first and second electrodes being located adjacent to each other at or near the other end.

3. A fluorescent light source comprising:
    a fluorescent lamp comprising two straight tube sections and an interconnection between said straight tube sections at or near one end, first and second electrodes being located adjacent to each other at or near the other end thereof for capacitive coupling of RF electrical energy to a low pressure discharge within said fluorescent lamp, each of said first and second electrodes comprising a conductive coil on the outside surface of said fluorescent lamp for inducing an axial magnetic field within said fluorescent lamp;
    ferromagnetic material between said straight tube sections at one or both ends of said conductive coils for increasing the magnetic field strength within said fluorescent lamp for a given current through said conductive coils; and
    an RF source having a first output lead electrically coupled to said first electrode and a second output lead electrically coupled to said second electrode.

4. A fluorescent light source as defined in claim 1 wherein said conductive coils each comprise a flat ribbon disposed on the outside surface of said fluorescent lamp.

5. A fluorescent light source as defined in claim 1 wherein said conductive coils are part of a resonant tank circuit of said RF source.

6. A fluorescent light source as defined in claim 1 wherein each conductive layer has an axial gap to prevent circumferential current flow.

7. A fluorescent light source as defined in claim 1 wherein said RF source has a frequency in the range of about 3 MHz to 300 MHz.

8. A fluorescent light source as defined in claim 1 wherein said RF source has a frequency in the range of about 10 MHz to 100 MHz.

9. A fluorescent light source as defined in claim 2 further including a lamp base for supporting said twin tube fluorescent lamp, said RF source being mounted within said lamp base.

* * * * *